(12) United States Patent
Fowe et al.

(10) Patent No.: US 10,140,854 B2
(45) Date of Patent: Nov. 27, 2018

(54) VEHICLE TRAFFIC STATE DETERMINATION

(71) Applicant: HERE Global B.V., Eindhoven (NL)

(72) Inventors: James Fowe, Chicago, IL (US); Filippo Pellolio, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 15/477,613

(22) Filed: Apr. 3, 2017

(65) Prior Publication Data

US 2018/0286220 A1    Oct. 4, 2018

(51) Int. Cl.
*G08G 1/00* (2006.01)
*G08G 1/16* (2006.01)
(Continued)

(52) U.S. Cl.
CPC ....... *G08G 1/0104* (2013.01); *B60R 21/0132* (2013.01); *B60W 30/0953* (2013.01);
(Continued)

(58) Field of Classification Search
CPC .......... G08G 1/0104; G08G 1/16; G08G 1/20; G01C 21/26; G01C 21/34; B60R 21/00; B60W 30/0953
See application file for complete search history.

(56) References Cited

U.S. PATENT DOCUMENTS

| | | | |
|---|---|---|---|
| 2002/0065599 A1* | 5/2002 | Hameleers | G08G 1/09 701/117 |
| 2003/0018428 A1* | 1/2003 | Knockeart | G01C 21/3415 342/357.31 |

(Continued)

FOREIGN PATENT DOCUMENTS

| | | |
|---|---|---|
| CN | 103413443 A | 11/2013 |
| CN | 104408924 B | 6/2016 |
| EP | 2624533 A1 | 8/2013 |

OTHER PUBLICATIONS

Lwin, Hnin Thant, et al., "Estimation of Road Traffic Congestion Using GPS Data", International Journal of Advanced Research in Computer and Communication Engineering, Dec. 2015, vol. 4, Issue 12, 5 pages, Tejass Publisheers, India.

Yuan, Jing, et al., "Driving with Knowledge from the Physical World", KDD 2011, Aug. 21-24, 2011, 9 pages, ACM, San Diego, CA.

*Primary Examiner* — Yonel Beaulieu
(74) *Attorney, Agent, or Firm* — Alston & Bird LLP

(57) ABSTRACT

An instance of probe data that was captured by sensors of a probe apparatus onboard a vehicle is received. Previous instances of probe data captured by the probe apparatus onboard the vehicle are accessed and the instance of probe is analyzed based on the previous instances of probe data. A current traffic state is determined for the vehicle based on the analysis. In an example embodiment, the analysis comprises generating a hidden Markov model based on speed data of the probe data. A Viterbi-path is obtained corresponding to the instance of probe data and the previous instances of probe data. The current traffic state is defined based on the Viterbi-path. The current traffic state may be used to determine traffic information/data for a road segment and/or predict a future traffic state for the vehicle. Traffic management decisions and/or routing decisions for the vehicle may be made based thereon.

20 Claims, 8 Drawing Sheets

(51) Int. Cl.
  *G01C 21/34* (2006.01)
  *B60R 21/00* (2006.01)
  *B60W 30/00* (2006.01)
  *G08G 1/01* (2006.01)
  *B60W 30/095* (2012.01)
  *G08G 1/0967* (2006.01)
  *B60R 21/0132* (2006.01)
  *G08G 1/0968* (2006.01)

(52) U.S. Cl.
  CPC ........... *G01C 21/34* (2013.01); *G08G 1/0133* (2013.01); *G08G 1/096741* (2013.01); *G08G 1/096805* (2013.01); *G08G 1/20* (2013.01)

(56) References Cited

U.S. PATENT DOCUMENTS

| | | | |
|---|---|---|---|
| 2008/0071465 A1 | 3/2008 | Chapman et al. | |
| 2008/0234921 A1* | 9/2008 | Groenhuijzen | G01C 21/3415 701/118 |
| 2009/0033540 A1* | 2/2009 | Breed | B60N 2/2863 342/29 |
| 2010/0280751 A1* | 11/2010 | Breed | G08G 1/161 701/414 |
| 2011/0046872 A1* | 2/2011 | Uyeki | G01C 21/3415 701/527 |
| 2011/0264371 A1* | 10/2011 | Uyeki | G01C 21/3415 701/414 |
| 2012/0307676 A1* | 12/2012 | Chan | H04W 24/08 370/252 |
| 2013/0095861 A1 | 4/2013 | Li et al. | |
| 2017/0098372 A1* | 4/2017 | Eilertsen | G08G 1/096775 |

* cited by examiner

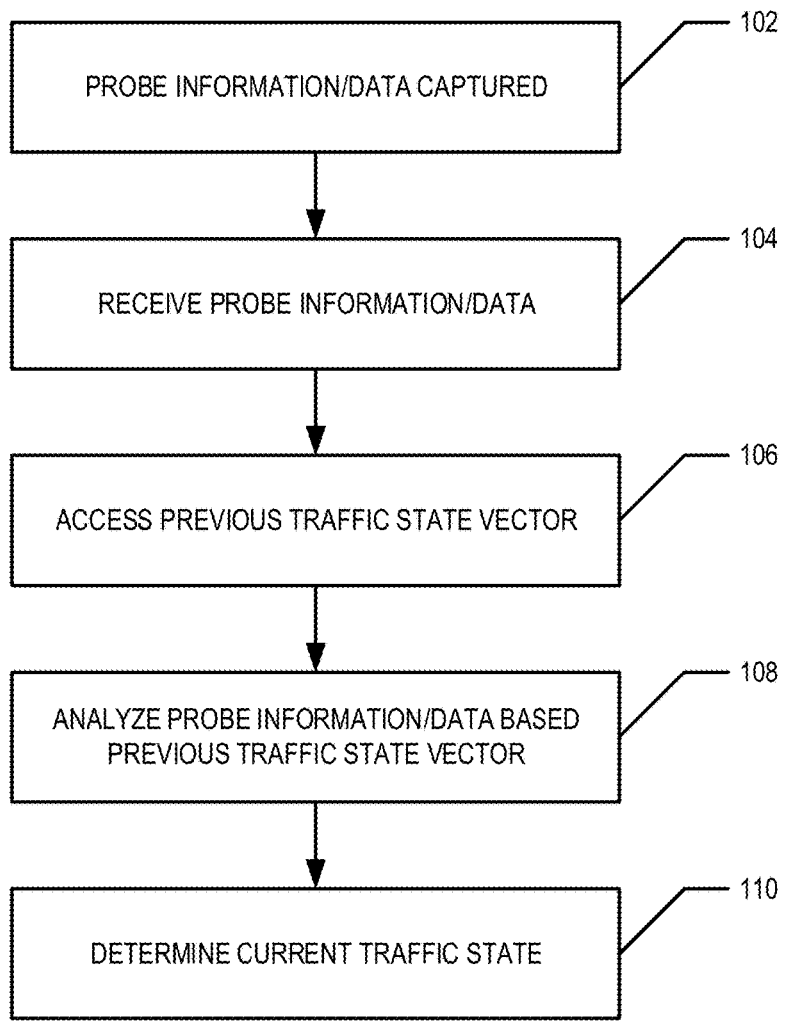

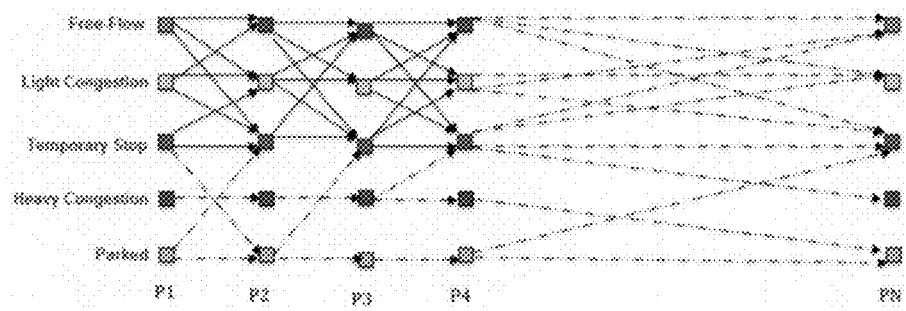
FIG. 4
| n \ n+1 | FF | LC | HC | TS | Pa |
|---|---|---|---|---|---|
| FF | 0.7 | 0.1 | 0.1 | 0.1 | 0 |
| LC | 0.2 | 0.5 | 0.2 | 0.05 | 0.05 |
| HC | 0.05 | 0.3 | 0.6 | 0 | 0.05 |
| TS | $1-(\sqrt[n_{ak}]{0.2})^{t_{timestep}}$ | 0 | 0 | $(\sqrt[n_{ak}]{0.2})^{t_{timestep}}$ | 0 |
| Pa | 0 | 0 | 0 | 0 | $(\sqrt[p_{ak}]{0.1})^{t_{timestep}}$ |
FIG. 5
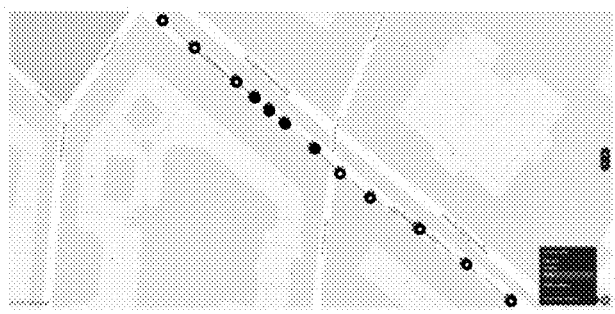
FIG. 7

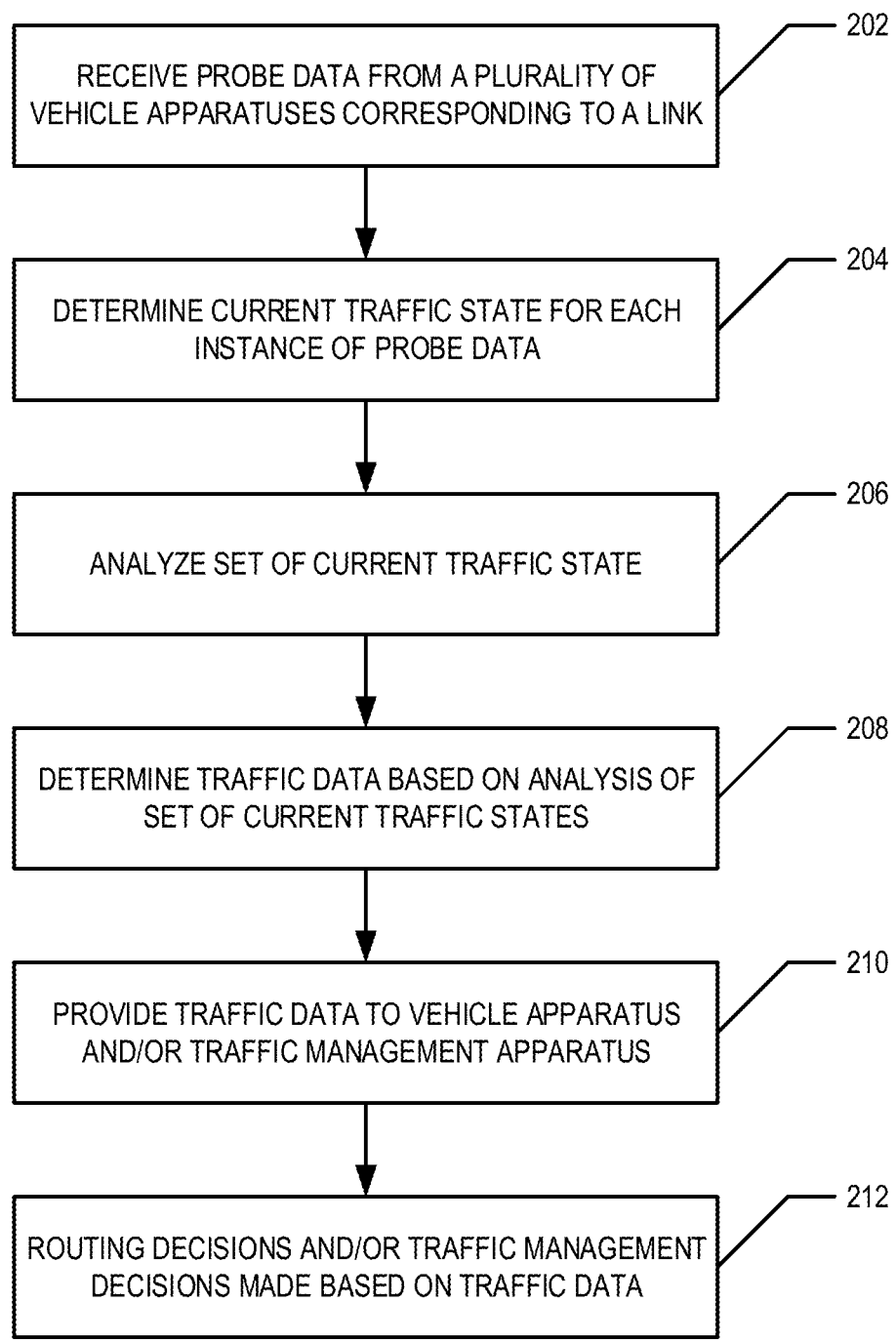

VEHICLE TRAFFIC STATE DETERMINATION

TECHNOLOGICAL FIELD

An example embodiment relates generally to an intelligent transportation system. An example embodiment relates generally to determining a traffic state for a vehicle or a road segment based on probe information/data.

BACKGROUND

Knowledge of the traffic conditions being experienced by a vehicle is generally helpful in understanding the traffic conditions of a road segment being traveled by the vehicle, in making route decisions for vehicle, and for making decisions dealing generally with traffic management. While many vehicles are now equipped with global navigation satellite system (GNSS) sensors (e.g., global positioning system (GPS) sensors in the United States), that may be used to determine a location of the vehicle and/or speed of the vehicle, the traffic state of a vehicle is difficult to determine based solely on location and/or speed data for a vehicle. For example, if the vehicle has a speed of zero miles per hour, the vehicle may be parked, at a temporary stop (e.g., at a traffic light), or in heavy congestion. As a result, determining when a vehicle is experiencing heavy congestion traffic conditions is difficult.

BRIEF SUMMARY OF SOME EXAMPLE EMBODIMENTS

At least some example embodiments are directed to determining a traffic state being experienced by a particular vehicle. For example, the traffic state for the vehicle may be determined based on probe information/data captured by a probe apparatus onboard the vehicle. A series or sequence of instances of probe information/data may be analyzed to determine the traffic state of the vehicle. For example, the series or sequence of instances of probe information/data may be analyzed by building a hidden Markov model, in which the traffic states are the underlying hidden states of the model, the observational probabilities are determined based on the speed or normalized speed of the vehicle (as indicated by the probe information/data), and the transition probabilities are determined based on apriori information/data and/or distance parameters for one or more states. A current traffic state for the vehicle may then be determined based on the hidden Markov model. For example, in an example embodiment, a Viterbi-path for the hidden Markov model is determined and the current traffic state for the vehicle is determined based on the Viterbi-path. In an example embodiment, the current traffic state for the vehicle and historical traffic information/data that may have vehicle level granularity may be used to determine a future traffic state for the vehicle. One or more routing decisions may be made based on the predicted future traffic state for the vehicle. In an example embodiment, traffic information/data for a road segment may be determined based on the current traffic state and/or probe information/data corresponding to a plurality of vehicles. The traffic information/data may be provided to one or more probe apparatuses and/or traffic management systems such that one or more routing decisions and/or one or more traffic management decisions may be made based thereon.

In an example embodiment, an instance of probe data is received. The instance of probe data is captured by one or more sensors of a probe apparatus onboard a vehicle. The instance of probe data comprises speed data indicating the speed of the vehicle when the instance of probe data was captured. One or more previous instances of probe data captured by the probe apparatus onboard the vehicle are accessed. The instance of probe data is analyzed based on the one or more previous instances of probe data. A current traffic state for the vehicle is determined based on the analysis of the instance of probe data based on the one or more previous instances of probe data.

In accordance with an example embodiment, a method is provided that comprises receiving an instance of probe data captured by one or more sensors of a probe apparatus onboard a vehicle. The instance of probe data comprises speed data indicating the speed of the vehicle when the instance of probe data was captured. The method further comprises accessing one or more previous instances of probe data captured by the probe apparatus onboard the vehicle; analyzing the instance of probe data based on the one or more previous instances of probe data; and determining a current traffic state for the vehicle based on the analysis of the instance of probe data based on the one or more previous instances of probe data.

In an example embodiment, analyzing the instance of probe data based on the one or more previous instances of probe data comprises generating a hidden Markov model based on the speed data of the instance of probe data and the previous instances of probe data; obtaining a Viterbi-path corresponding to the instance of probe data and the previous instances of probe data; and defining the current traffic state based on the Viterbi-path. In an example embodiment, the hidden Markov model is generated based at least in part on one or more transition probabilities and at least one of the one or more transition probabilities is distance dependent. In an example embodiment, the hidden Markov model is generated based at least in part on one or more observation probabilities and the one or more observation probabilities are dependent on normalized speed determined based at least in part on the speed data. In an example embodiment, the hidden Markov model is built based on a set of traffic states, the set of traffic states comprising a free flow state, a light congestion state, a heavy congestion state, a temporary stop state, and a parked state. In an example embodiment, the method further comprises determining that the vehicle is not in the temporary stop state or in the parked state; and determining a representative speed for a road segment identified based on the instance of probe data based at least in part on the speed data.

In an example embodiment, the method further comprises determining a traffic state for a road segment corresponding to location data based at least in part on the current traffic state, wherein the instance of probe data comprises the location data; and providing the traffic state for the road segment to at least one of a probe apparatus, a traffic management system, or both. In an example embodiment, the method further comprises analyzing relevant historical probe data corresponding to the instance of probe data; generating a predicted future traffic state for the vehicle based on the analysis of the relevant historical probe data; and providing a communication comprising the predicted future traffic state to the probe apparatus, wherein the probe apparatus process the communication and, responsive thereto, provides the predicted future traffic state via a user interface of the probe apparatus. In an example embodiment, the method further comprises receiving a rerouting request; and determining a new route for the vehicle based on the analysis of the relevant historical probe data.

In accordance with an example embodiment, an apparatus is provided that comprises at least one processor, at least one memory storing computer program code, with the at least one memory and the computer program code configured to, with the processor, cause the apparatus to at least receive an instance of probe data captured by one or more sensors of a probe apparatus onboard a vehicle. The instance of probe data comprises speed data indicating the speed of the vehicle when the instance of probe data was captured. The at least one memory and the computer program code are further configured to, with the processor, cause the apparatus to access one or more previous instances of probe data captured by the probe apparatus onboard the vehicle; analyze the instance of probe data based on the one or more previous instances of probe data; and determine a current traffic state for the vehicle based on the analysis of the instance of probe data based on the one or more previous instances of probe data.

In an example embodiment, to analyze the instance of probe data based on the one or more previous instances of probe data the at least one memory and the computer program code are configured to, with the processor, cause the apparatus to at least generate a hidden Markov model based on the speed data of the instance of probe data and the previous instances of probe data; obtain a Viterbi-path corresponding to the instance of probe data and the previous instances of probe data; and define the current traffic state based on the Viterbi-path. In an example embodiment, the hidden Markov model is generated based at least in part on one or more transition probabilities and at least one of the one or more transition probabilities is distance dependent. In an example embodiment, the hidden Markov model is generated based at least in part on one or more observation probabilities and the one or more observation probabilities are dependent on normalized speed determined based at least in part on the speed data. In an example embodiment, the hidden Markov model is built based on a set of traffic states, the set of traffic states comprising a free flow state, a light congestion state, a heavy congestion state, a temporary stop state, and a parked state. In an example embodiment, the at least one memory and the computer program code are further configured to, with the processor, cause the apparatus to determine that the vehicle is not in the temporary stop state or in the parked state; and determining a representative speed for a road segment identified based on the instance of probe data based at least in part on the speed data.

In an example embodiment, the at least one memory and the computer program code are further configured to, with the processor, cause the apparatus to determine a traffic state for a road segment corresponding to location data based at least in part on the current traffic state, wherein the instance of probe data comprises the location data; and provide the traffic state for the road segment to at least one of a probe apparatus, a traffic management system, or both. In an example embodiment, the at least one memory and the computer program code are further configured to, with the processor, cause the apparatus to analyze relevant historical probe data corresponding to the instance of probe data; generate a predicted future traffic state for the vehicle based on the analysis of the relevant historical probe data; and provide a communication comprising the predicted future traffic state to the probe apparatus, wherein the probe apparatus process the communication and, responsive thereto, provides the predicted future traffic state via a user interface of the probe apparatus. In an example embodiment, the at least one memory and the computer program code are further configured to, with the processor, cause the apparatus to receive a rerouting request; and determine a new route for the vehicle based on the analysis of the relevant historical probe data.

In accordance with an example embodiment, a computer program product is provided that comprises at least one non-transitory computer-readable storage medium having computer-executable program code instructions stored therein with the computer-executable program code instructions comprising program code instructions configured to receive an instance of probe data captured by one or more sensors of a probe apparatus onboard a vehicle. The instance of probe data comprises speed data indicating the speed of the vehicle when the instance of probe data was captured. The computer-executable program code instructions further comprise program code instructions configured to access one or more previous instances of probe data captured by the probe apparatus onboard the vehicle; analyze the instance of probe data based on the one or more previous instances of probe data; and determine a current traffic state for the vehicle based on the analysis of the instance of probe data based on the one or more previous instances of probe data.

In an example embodiment, to analyze the instance of probe data based on the one or more previous instances of probe data the computer-executable program code instructions comprise program code instructions configured to at least generate a hidden Markov model based on the speed data of the instance of probe data and the previous instances of probe data; obtain a Viterbi-path corresponding to the instance of probe data and the previous instances of probe data; and define the current traffic state based on the Viterbi-path. In an example embodiment, the hidden Markov model is generated based at least in part on one or more transition probabilities and at least one of the one or more transition probabilities is distance dependent. In an example embodiment, the hidden Markov model is generated based at least in part on one or more observation probabilities and the one or more observation probabilities are dependent on normalized speed determined based at least in part on the speed data. In an example embodiment, the hidden Markov model is built based on a set of traffic states, the set of traffic states comprising a free flow state, a light congestion state, a heavy congestion state, a temporary stop state, and a parked state. In an example embodiment, the computer-executable program code instructions further comprise program code instructions configured to determine that the vehicle is not in the temporary stop state or in the parked state; and determining a representative speed for a road segment identified based on the instance of probe data based at least in part on the speed data.

In an example embodiment, the computer-executable program code instructions further comprise program code instructions configured to determine a traffic state for a road segment corresponding to location data based at least in part on the current traffic state, wherein the instance of probe data comprises the location data; and provide the traffic state for the road segment to at least one of a probe apparatus, a traffic management system, or both. In an example embodiment, the computer-executable program code instructions further comprise program code instructions configured to analyze relevant historical probe data corresponding to the instance of probe data; generate a predicted future traffic state for the vehicle based on the analysis of the relevant historical probe data; and provide a communication comprising the predicted future traffic state to the probe apparatus, wherein the probe apparatus process the communication and, responsive thereto, provides the predicted future traffic state via a user interface of the probe apparatus. In an example embodiment, the computer-executable program code instructions further comprise program code instructions configured to receive a rerouting request; and determine a new route for the vehicle based on the analysis of the relevant historical probe data.

In accordance with yet another example embodiment of the present invention, an apparatus is provided that comprises means for receiving an instance of probe data captured by one or more sensors of a probe apparatus onboard a vehicle. The instance of probe data comprises speed data indicating the speed of the vehicle when the instance of probe data was captured. The apparatus further comprises means for accessing one or more previous instances of probe data captured by the probe apparatus onboard the vehicle. The apparatus further comprises means for analyzing the instance of probe data based on the one or more previous instances of probe data. The apparatus further comprises means for determining a current traffic state for the vehicle based on the analysis of the instance of probe data based on the one or more previous instances of probe data.

BRIEF DESCRIPTION OF THE DRAWINGS

Figure 1:
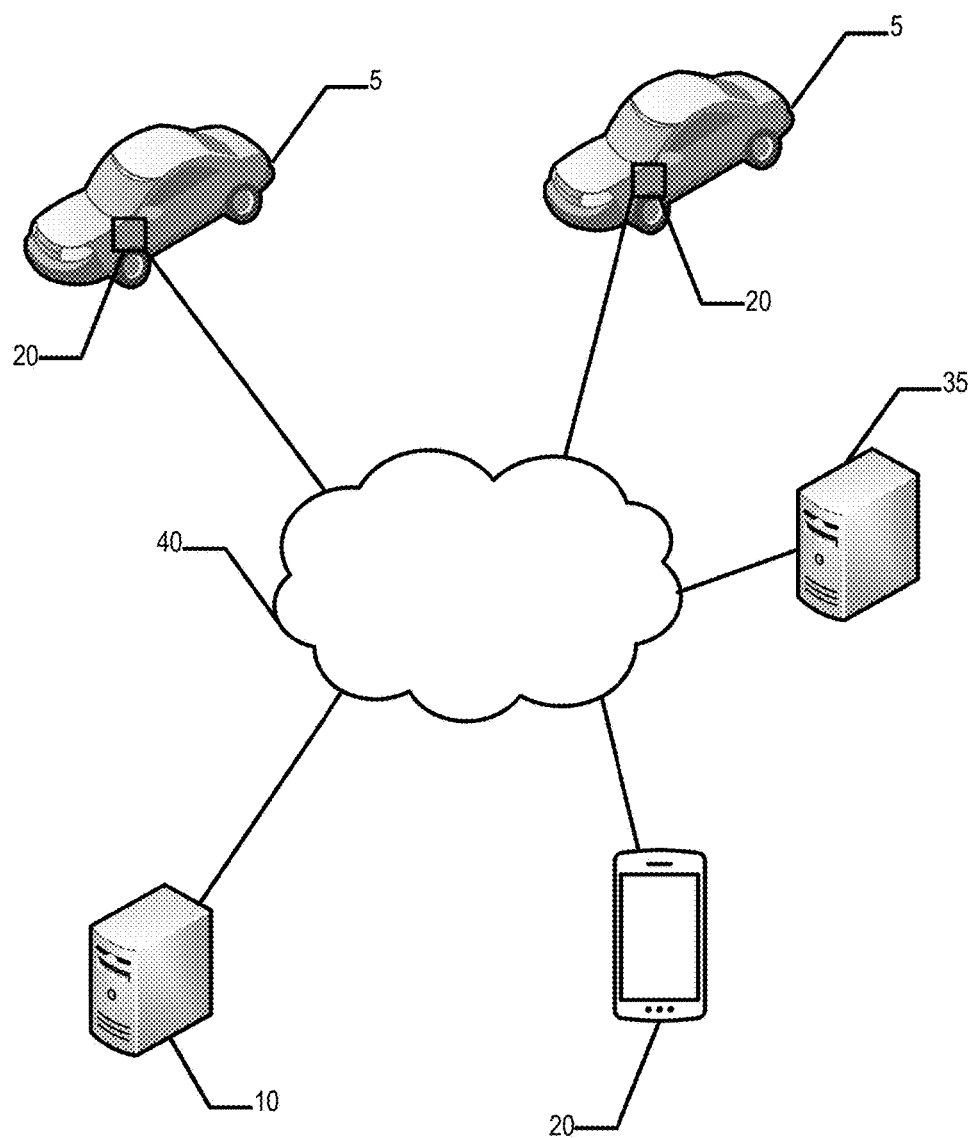
Figure 2A:
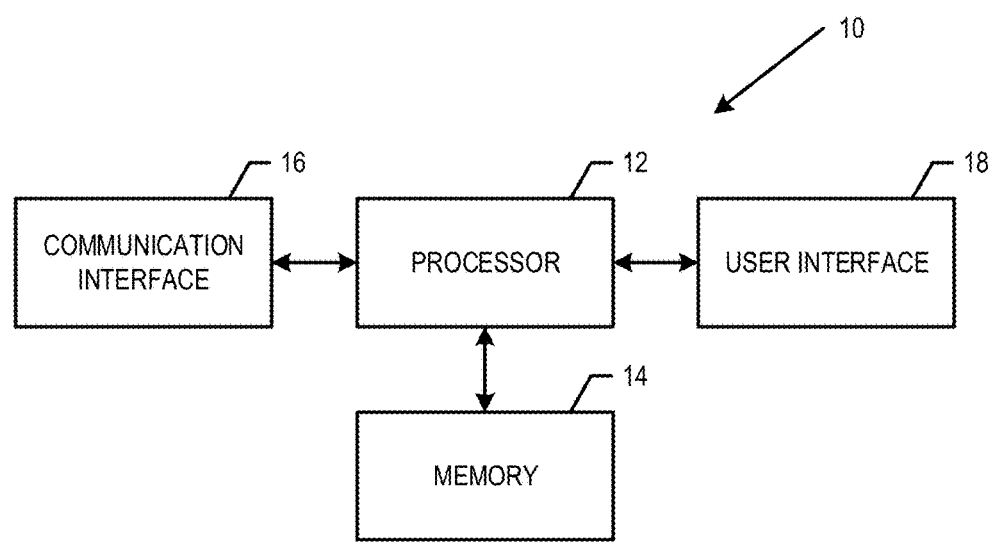
Figure 2B:
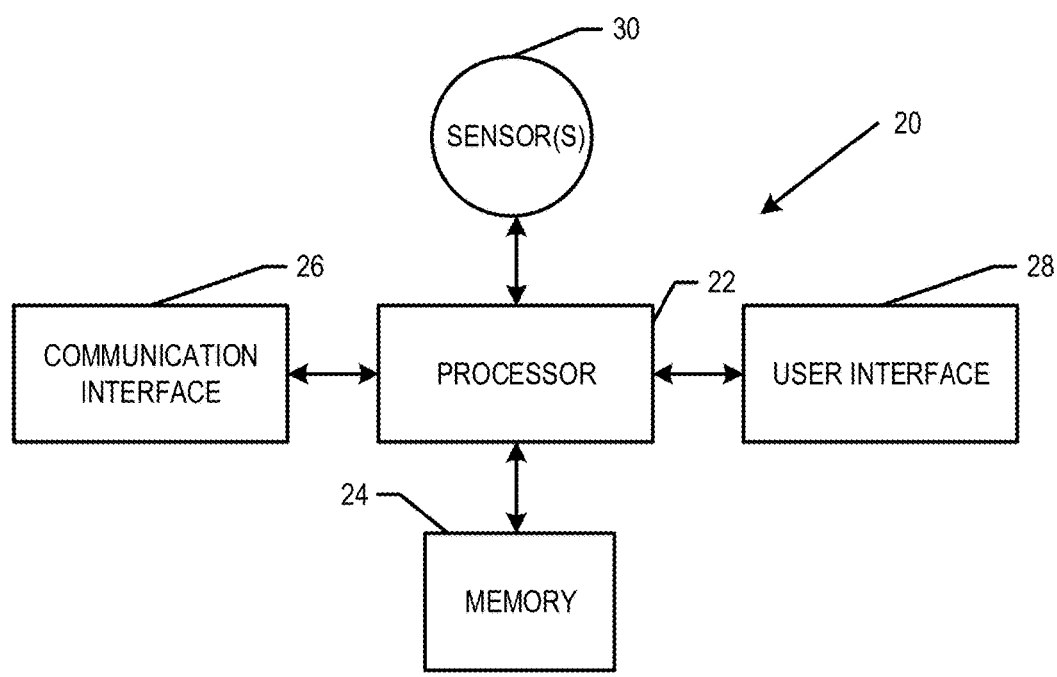
Figure 6A:
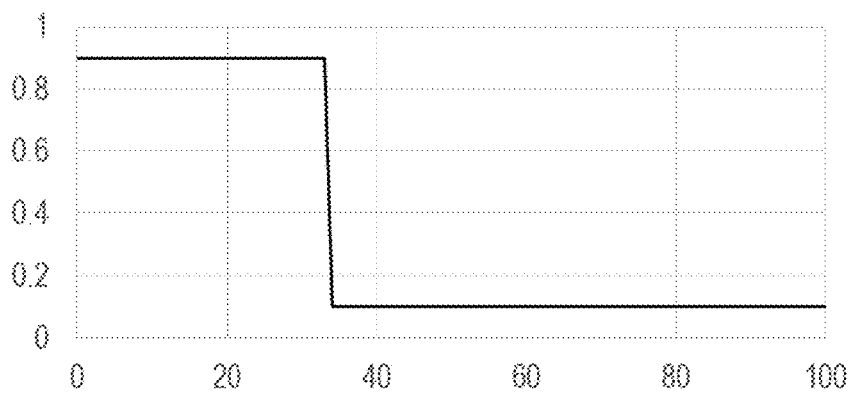
Figure 6B:
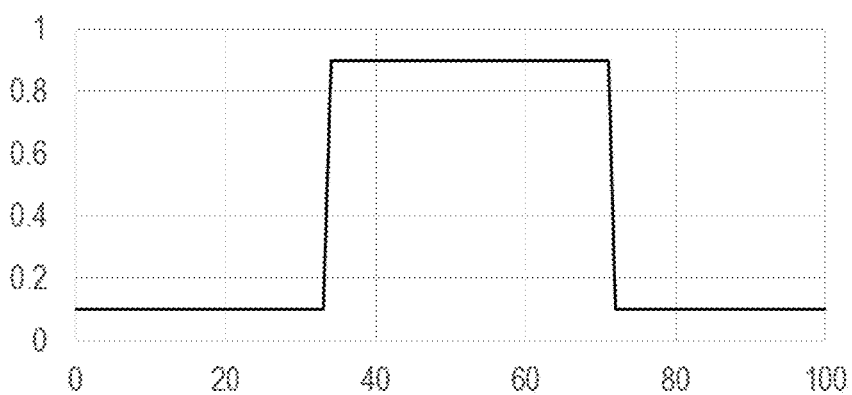
Figure 6C:
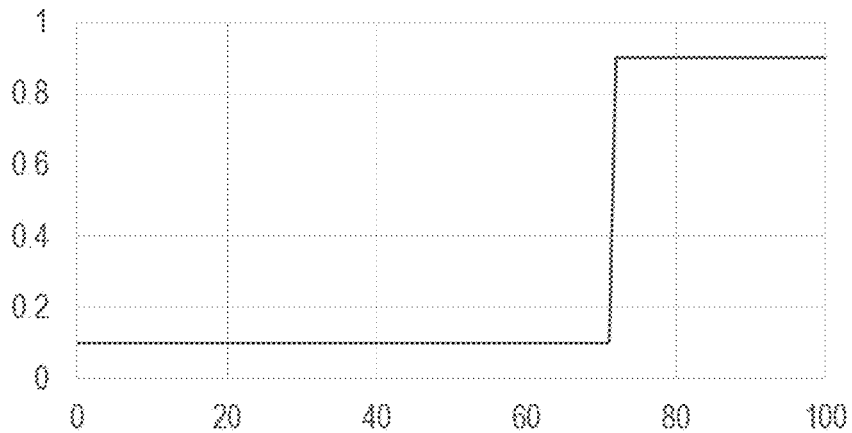
Figure 9:
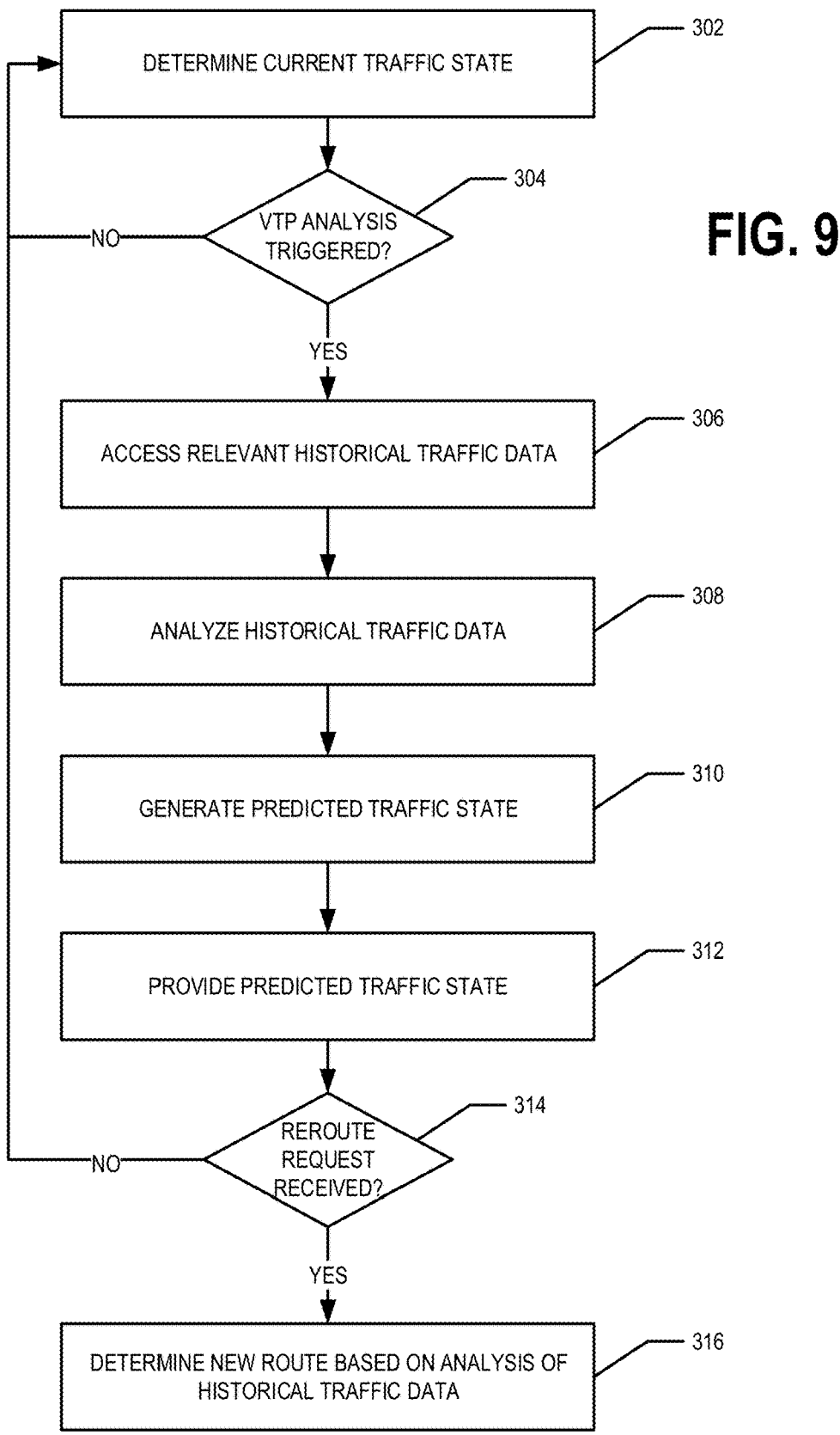

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a remote apparatus that may be specifically configured in accordance with an example embodiment;

FIG. 2B is a block diagram of a probe apparatus that may be specifically configured in accordance with an example embodiment;

FIG. 3 is a flowchart illustrating operations performed, such as by the apparatus of FIGS. 2A and/or 2B to determine a traffic state of a vehicle, in accordance with an example embodiment;

FIG. 4 is diagram of a model that may be generated to determine a traffic state vector for a vehicle, in accordance with an example embodiment;

FIG. 5 provides a table of an example transition probability matrix, in accordance with an example embodiment;

FIGS. 6A, 6B, and 6C illustrate example observation probabilities for a set of traffic states, in accordance with an example embodiment;

FIG. 7 illustrates an example of a series or sequence of traffic states determined for a vehicle overlaid on top of map information/data;

FIG. 8 is a flowchart illustrating operations performed, such as by the apparatus of FIGS. 2A and/or 2B to determine traffic data based on determined traffic states for one or more vehicles, in accordance with an example embodiment; and FIG. 9 is a flowchart illustrating operations performed, such as by the apparatus of FIGS. 2A and/or 2B to use historical traffic patterns for predicting a future vehicle state for a vehicle, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to determine a traffic state of a vehicle. In some example embodiments, the vehicle traffic state may be used to determine traffic conditions and/or traffic information/data for a road segment, predict a future traffic state for the vehicle, and/or the like. For example, a probe apparatus 20 may capture and/or provide an instance of probe information/data at a regular time and/or distance interval, periodically, and/or the like. Thus, in an example embodiment, a series or sequence of probe information/data may be captured by a probe apparatus 20. One or more instances of probe information/data of the series or sequence of probe information/data may be analyzed. For example, a hidden Markov model (HMM) may be used to analyze one or more instances of the probe information/data of the series or sequence of probe information/data. Based on the analysis of the one or more instances of probe information/data, a vehicle traffic state vector may be determined. In an example embodiment, a vehicle traffic state vector comprises a probability that the corresponding vehicle 5 (which the probe apparatus 20 is onboard) is in each of a set of traffic states. In an example embodiment, the set of traffic states consists of a parked state, temporary stop state, heavy congestion state, light congestion state, and free flow state. Various embodiments may use a variety of sets of traffic states as appropriate for the application. Based on the vehicle traffic state vector, a most likely vehicle traffic state may be identified. In an example embodiment, the vehicle traffic state may be determined to be the most likely vehicle traffic state identified based on the vehicle traffic state vector. Once a vehicle traffic state is determined for a vehicle 5, the vehicle traffic state vector may be used to determine traffic conditions for a road segment along which the vehicle 5 is traveling, making routing decisions for the vehicle 5 (e.g., using historical vehicular traffic pattern information/data), stored as historical vehicular traffic pattern information/data, used to predict a future traffic state for the vehicle (e.g., using historical vehicular traffic pattern information/data), used to inform a traffic management system, and/or the like.

FIG. 1 provides an illustration of an example system that can be used in conjunction with various embodiments of the present invention. As shown in FIG. 1, the system may include a plurality of probe apparatuses 20, one or more remote apparatuses 10, one or more other computing entities 35, one or more networks 40, and/or the like. In various embodiments, the probe apparatus 20 may be an in vehicle navigation system, vehicle control system, a mobile computing device, and/or the like. For example, a probe apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the probe apparatus 20 may be a smartphone, tablet, personal digital assistant (PDA), and/or other mobile computing device. In another example, the probe apparatus 20 may be a vehicle control system configured to autonomously drive a vehicle 5, assist in control of a vehicle 5, and/or the like. In example embodiments, a probe apparatus 20 is onboard a dedicated probe vehicle. In some embodiments, a probe apparatus 20 may be onboard a personal vehicle, commercial vehicle, public transportation vehicle, and/or other vehicle. In an example embodiment, a probe apparatus 20 is any apparatus that provides (e.g., transmits) probe information/data to the remote apparatus 10.

In an example embodiment, a remote apparatus 10 may comprise components similar to those shown in the example remote apparatus 10 diagrammed in FIG. 2A. In an example embodiment, the remote apparatus 10 is configured to provide map updates, traffic information/data, and/or the like to the probe apparatus 20 and/or computing entity 35. In an example embodiment, the remote apparatus 10 may be configured to store historical probe information/data, historical vehicular traffic pattern information/data, current trip probe information/data, perform Cloud-based computing network and/or environment processing of for one or more probe apparatuses 20, and/or the like. In an example embodiment, a probe apparatus 20 may comprise components similar to those shown in the example probe apparatus 20 diagrammed in FIG. 2B. In an example embodiment, a probe apparatus 20 may be configured to collect probe information/data, provide probe information/data, receive map updates, receive traffic information/data, make and/or carry out routing decisions, and/or the like. For example, in one embodiment, the probe apparatus 20 may be configured to autonomously drive the vehicle 5 and/or assist in driving the vehicle 5. In various embodiments, the remote apparatus 10 may be located remotely from the probe apparatus 20.

Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a probe apparatus 20 may be in communication with a remote apparatus 10 via the network 40. For example, the probe apparatus 20 may communicate with the remote apparatus 10 via a network, such as the Cloud. For example, the Cloud may be a computer network that provides shared computer processing resources and data to computers and other devices connected thereto. For example, the probe apparatus 20 may be configured to receive one or more map tiles of a digital map from the remote apparatus 10, traffic information/data (embedded in a map tile of a digital map and/or separate therefrom), and/or provide probe information/data to the remote apparatus 10.

In an example embodiment, as shown in FIG. 2B, the probe apparatus 20 may comprise a processor 22, memory 24, a communications interface 26, a user interface 28, one or more sensors 30 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; and/or other sensors that enable the probe apparatus 20 to determine one or more features of the corresponding vehicle's 5 surroundings), and/or other components configured to perform various operations, procedures, functions or the like described herein. In at least some example embodiments, the memory 24 is non-transitory.

Similarly, as shown in FIG. 2A, the remote apparatus 10 may comprise a processor 12, memory 14, a user interface 18, a communications interface 16, and/or other components configured to perform various operations, procedures, functions or the like described herein. In at least some example embodiments, the memory 14 is non-transitory.

The computing entity 35 may comprise similar elements to the remote apparatus 10 and/or the probe apparatus 20. For example, the computing entity 35 may comprise a processor, memory, a user interface, a communications interface, and/or the like. In example embodiments, the computing entity 35 may comprise one or more sensors similar to sensor(s) 30. Certain example embodiments of the probe apparatus 20 and the remote apparatus 10 are described in more detail below with respect to FIGS. 2A and 2B.

II. Example Operation

In at least some example embodiments, probe information/data may be analyzed to determine a vehicle traffic state corresponding to a vehicle 5. For example, a series or sequence of instances probe information/data captured by a probe apparatus 20 onboard a vehicle 5 may be analyzed to determine a vehicle traffic state for the vehicle. In an example embodiment, the vehicle traffic state may then be used to determine traffic information/data for a road segment the vehicle 5 is traveling along, predict a future traffic state for the vehicle, make one or more routing decisions for the vehicle, inform a traffic management system, and/or the like. In an example embodiment, the vehicle traffic state and/or a portion of the probe information/data may be stored for future use as historical vehicular traffic pattern information/data.

In an example embodiment, probe information/data is captured by a probe apparatus 20. For example, the probe apparatus 20 may comprise one or more sensors 30 configured to capture probe information/data. For example, the probe apparatus 20 may comprise a real time clock and may cause one or more sensors 30 to capture sensor measurements in parallel, sequentially, and/or approximately simultaneously such that probe information/data is determined. In another example, the probe apparatus 20 may use the processor cycles to cause one or more sensors 30 to capture sensor measurements in parallel, sequentially, and/or approximately simultaneously such that probe information/data is determined. In an example embodiment, the real time clock and/or processor cycles may be used to capture probe information/data at a configurable and/or predetermined frequency (e.g., 1 Hz and/or the like). In an example embodiment, probe information/data may comprise location information/data (e.g., latitude and longitude), a heading (e.g., a direction in which the vehicle 5 is facing), speed information/data (e.g., the speed at which the vehicle 5 is moving), one or more images, a time at which the sensor measurements were captured, and/or the like.

In an example embodiment, a hidden Markov model (HMM) is used to analyze the probe information/data and/or a series or sequence of instances of probe information/data. In example embodiments, a HMM may be determined by a set of vehicle states, a transition probability matrix, and a set observation probability. The set of vehicle states is a list of the vehicles states that the vehicle 5 may be in at any given time. In an example embodiment, the set of vehicles states comprises and/or consists of parked, temporary stop, heavy congestion, light congestion, and free flow. A transition probability matrix provides a probability that given that a vehicle is in a first state at time $t_n$, that the vehicle will be in a second state at time $t_{n+1}$. For example, if it is determined that a vehicle is traveling at free flow at time $t_n$ the probability matrix provides a probability that the vehicle will be parked, at a temporary stop, traveling in heavy congestion, traveling in light congestion, or traveling at free flow at time $t_{n+1}$. FIG. 5 provides an example transition probability matrix, according to an example embodiment. An observation probability is the probability that a particular observation value will be observed when the vehicle 5 is in a particular state. For example, if a vehicle 5 is traveling at free flow, it is likely that the speed of the vehicle will be approximately the free flow speed for the road segment the vehicle is traveling along. Similarly, if the vehicle 5 is parked, it is likely that the speed of the vehicle will be zero. FIGS. 6A, 6B, and 6C provide plots of example observation probabilities. Given a series or sequence of instances of probe information/data, a vehicle traffic state vector may be determined. For example, the trellis diagram shown in FIG. 4 illustrates a series of vehicle traffic state vectors P1, P2, P3, P4, . . . , PN. The arrows in FIG. 4 illustrate possible transitions between vehicle traffic states of the vehicle traffic state vectors P1, P2, P3, P4, . . . , PN. Thus, a series or sequence of instances of probe information/data may be used to determine a vehicle traffic state vector. When a new instance of probe information/data is captured and/or received, a new vehicle traffic state vector may be determined. For example, a new vehicle traffic state vector may be determined in real time and/or near real time. A current vehicle traffic state may then be determined based on the new vehicle traffic state vector. The current vehicle traffic state may then be used to determine traffic information/data for the road segment the vehicle 5 is traveling along (e.g., as determined based on the location information/data of the probe information/data), a predicted future traffic state for the vehicle, and/or the like. In an example embodiment, the current vehicle traffic state may be used to determine real time and/or near real time traffic information/data for the road segment the vehicle 5 is traveling along, a predicted and/or future traffic state for the vehicle that may be used to make real time, near real time, and/or future routing decisions for the vehicle 5, and/or the like. For example, the vehicle traffic state of one or more vehicles traveling along a road segment may be used to determine a traffic information/data for the road segment. In another example, historical vehicular traffic pattern information/data may be accessed and used to determine a future vehicle traffic state for the vehicle based on the current vehicle traffic state.

Example embodiments of the present invention provide an improvement to computer-related technology. For example, generally, determining a vehicle traffic state for a vehicle based solely on probe information/data is difficult as a vehicle speed of zero could correspond to multiple traffic states (e.g., parked, temporary stop, and/or heavy congestion). Example embodiments of the present invention provide an automatic determination of a traffic state for a particular vehicle based solely on the probe information/data for the vehicle 5 (e.g., a series or sequence of instances of probe information/data corresponding to the vehicle 5). Thus, various example embodiments improve computer-related technology by providing an automated technique for determining a traffic state vector for a particular vehicle 5 based on the probe information/data for the vehicle. Various example embodiments provide further improvements to computer-related technology by providing an automated determination of traffic information/data based on the vehicle traffic state of one or more vehicles. The traffic information/data may be provided to a traffic management system (e.g., computing entity 35) for use in an intelligent transportation system to improve traffic flow, provided to one or more probe apparatuses 20 for use in routing decisions, and/or the like. Various example embodiments provide further improvements to computer-related technology by providing a predicted and/or future traffic state for a particular vehicle 5. In an example embodiment, the predicted and/or future traffic state for the particular vehicle 5 may be provided (e.g., displayed, audibly provided, and/or the like) to a user (e.g., an operator of the vehicle) and/or used to make one or more routing decisions for the vehicle 5. For example, the vehicle traffic state, traffic information/data, predicted and/or future vehicle traffic state, and/or the like may be determined in real time and/or near real time and used to make real time, near real time, and/or future routing decisions for the vehicle 5.

Determining a Vehicle Traffic State

An example embodiment provides for determination of a vehicle traffic state. In an example embodiment, a vehicle traffic state is a traffic state of a particular vehicle. In an example embodiment, the vehicle traffic state corresponding to the vehicle 5 is determined based on analysis of one or more instances of probe information/data captured by a probe apparatus 20 onboard the vehicle 5. For example, a vehicle traffic state corresponding to a vehicle 5 may be determined based on analysis of a series or sequence of instances of probe information/data captured by the probe apparatus 20 onboard the vehicle 5. In an example embodiment, the vehicle traffic state may be used to determine traffic information/data for a road segment being traveled by the vehicle 5 (which may in turn be used to make one or more routing decisions for one or more vehicles 5), used to determine a predicted and/or future traffic state for the vehicle 5 (which may in turn be used to make one or more routing decision for the vehicle 5), and/or the like. In an example embodiment, the analysis of the one or more instances of probe information/data (e.g., the series or sequence of instances of probe information/data) may be performed using a HMM. In an example embodiment, the vehicle traffic state is determined based on the set of traffic states comprising and/or consisting of a parked state, temporary stop state, heavy congestion state, light congestion state, and free flow state. In an example embodiment, a vehicle 5 is in a parked state when the vehicle is parked (e.g., the transmission is in park, a trip has been completed, and/or the like). In an example embodiment, a vehicle 5 is in a temporary stop state when the vehicle is stopped at a traffic light, stop sign, stopped on the side of the road so a passenger can get in/out, and/or the like. In an example embodiment, a vehicle 5 is in a heavy congestion state when the vehicle is traveling under heavy congestion traffic conditions. In an example embodiment, a vehicle 5 is in a light congestion state when the vehicle is traveling under light congestion traffic conditions. In an example embodiment, a vehicle 5 is in a free flow state when the vehicle is traveling under free flow traffic conditions.

FIG. 3 provides a flowchart illustrating processes and procedures that may be completed, for example by a remote apparatus 10 and/or a probe apparatus 20, to determine a vehicle traffic state corresponding to a vehicle 5. Starting at block 102, probe information/data is captured. For example, a probe apparatus 20 onboard a vehicle 5 may capture probe information/data. For example, a probe apparatus may comprise means, such as the processor 22, memory 24, sensors 30, and/or the like, for capturing probe information/data. In an example embodiment, probe information/data may comprise location information/data (e.g., latitude and longitude), a heading (e.g., a direction in which the vehicle 5 is facing), speed information/data (e.g., the speed at which the vehicle 5 is moving), one or more images, a time stamp indicating a time at which the sensor measurements were captured, a vehicle identifier configured to uniquely identify the vehicle 5 and/or the probe apparatus 20, and/or the like. For example, probe information/data corresponding to time $t_{n+1}$ may be captured. For example, the location information/data may be determined by a location sensor of the one or more sensors 30 (e.g., GNSS and/or GPS sensor, IMUs, odometry based localization technique using an image captured by an image capturing device, and/or the like). The speed information/data may be determined directly or indirectly by the location sensor of the one or more sensors 30 (e.g., a direct measurement by an IMU or GNSS and/or GPS sensor, indirectly by determining the distance traveled between consecutive location measurements, and/or the like). In an example embodiment, the probe apparatus 20 may be configured to capture probe information/data at a regular time and/or distance interval, periodically, and/or the like. In an example embodiment, the probe apparatus 20 only captures probe information/data when the engine is on, the operating system of the vehicle is powered up, and/or the like.

In an example embodiment, the probe apparatus 20 may determine the vehicle traffic state based on the captured probe information/data. In another example embodiment, the remote apparatus 10 may determine the vehicle traffic state for the vehicle 5 based on the probe information/data captured by the probe apparatus 20. For example, the remote apparatus 10 may be configured to determine the traffic state vector for the vehicle 5 using a Cloud-based computing network and/or environment technique. In such an embodiment, the probe apparatus 20 may provide (e.g., transmit) the probe information/data. For example, the probe apparatus 20 may comprise means, such as the processor 22, communications interface 26, and/or the like, for providing the probe information/data. For example, the remote apparatus 10 may receive the probe information/data, at block 104. For example, the remote apparatus 10 may comprise means, such as the processor 12, communications interface 16, and/or the like, for receiving the probe information/data. For example, the remote apparatus 10 may receive the probe information/data corresponding to time $t_{n+1}$. In an example embodiment, the probe apparatus 20 may provide each instance of probe information/data as the probe information/data is captured. In another example embodiment, the probe apparatus 20 may batch a plurality of instances of probe information/data and provide the plurality of instance of probe information/data together. For example, the probe apparatus 20 may provide the instances of probe information/data captured over a 30 second, one minute, five minute and/or the like period as a batch of probe information/data. For example, the probe apparatus 20 may provide 30 instances of probe information/data captured over a 30 second time interval as a batch of probe information/data.

At block 106, the previous traffic state vector for the vehicle 5 may be accessed. For example, a traffic state vector for the vehicle 5 may have been previously determined, for example, based on the previous instance of probe information/data. For example, the remote apparatus 10 (or the probe apparatus 20) may have previously determined a traffic state vector for the vehicle 5 and stored the previous traffic state vector in memory (e.g., memory 14, 24). The remote apparatus 10 (and/or probe apparatus 20) may access the previous traffic state vector for the vehicle 5. For example, the remote apparatus 10 may comprise means, such as the processor 12, memory 14, and/or the like for accessing the previous traffic state vector for the vehicle 5. For example, the previous traffic state vector for the vehicle 5 may be identified based on the vehicle identifier of the probe information/data and a vehicle identifier stored in association with the previous traffic state vector. In an example embodiment, the previous traffic state vector for the vehicle 5 corresponds to a time $t_n$, determined by the time stamp of the last instance of probe information/data used to determine the previous traffic state vector. The previous traffic state vector comprises a probability that the vehicle was in each traffic state of a set of traffic states at the time $t_n$. For example, in one example embodiment, the previous traffic state vector comprises the probability that the vehicle was in each of a parked state, a temporary stop state, a heavy congestion state, a light congestion state, and a free flow state at time $t_n$. In an example embodiment, the previous traffic state vector is a normalized probability vector, wherein the sum of the probabilities that the vehicle is in each state is 1. In an example embodiment, more than one previous traffic state vector may be accessed. For example, in an example embodiment, a series or sequence of previous traffic state vectors may be accessed and/or a series or sequence of probe information/data may be accessed.

At block 108, the probe information/data corresponding to time $t_{n+1}$ (e.g., the current probe information/data) may be analyzed in light of the previous traffic state vector for the vehicle. For example, the remote apparatus 10 (or the probe apparatus 20) may analyze the current probe information/data for the vehicle 5 in light of the previous traffic state vector for the vehicle. For example, the remote apparatus 10 may comprise means, such as the processor 12 and/or the like, for analyzing the current probe information/data in light of the previous traffic state vector for the vehicle. For example, an HMM may be used to analyze the current probe information/data.

In an example embodiment, a hidden Markov model (HMM) is built based on the previous traffic state vector, transition probability matrix, and observation probabilities. For example, the remote apparatus 10 may build a HMM based on the previous traffic state vector, transition probability matrix, and observation probabilities. In general, an HMM is a statistical Markov model in which the system being modeled is assumed to be a Markov chain with unobserved (e.g., hidden) states. In particular, the possible states of the HMM correspond to the traffic states of the set of traffic states. The observation probabilities correspond to the probability that a particular observation corresponds to a particular state. For example, in an example embodiment, the probe information/data comprises speed information/data. For example, the speed information/data may indicate the speed at which the vehicle 5 is traveling when the current probe information/data is captured. The speed information/data may then be used to determine the probability that the vehicle 5 is experiencing a particular traffic state. The transition probability matrix provides the probability that a vehicle will transition from a first traffic state at time $t_n$ to a second traffic state at time $t_{n+1}$. The transition probability matrix and the previous traffic state vector may be used to determine the likelihood that the vehicle 5 is in a particular traffic state at time $t_n$ based on the previous traffic state of the vehicle 5. For example, FIG. 4 shows an example trellis diagram illustrating the HMM for a model wherein the set of traffic states comprises a parked state, temporary stop state, heavy congestion state, light congestion state, and free flow state and for a series or sequence of N instances of probe information/data.

FIG. 5 illustrates an example transition matrix, according to an example embodiment. For example, if at time $t_n$ the vehicle is in a heavy congestion state, the probability that the vehicle will be in a free flow state at time $t_{n+1}$ is 0.05. In an example embodiment, the transition matrix is dependent on the distance traveled by the vehicle 5 between the time $t_n$ when the previous instance of probe information/data was captured (e.g., corresponding to the previous traffic state vector) and the time $t_{n+1}$ when the current instance of probe information/data was captured. In an example embodiment, the transition matrix is dependent on the distance travelled by the vehicle 5 since the vehicle entered a particular traffic state. In an example embodiment, the transition matrix is dependent on the distance travelled by the vehicle 5 between two adjacent instances of probe information/data. For example, the HMM may be a variable transition model and/or an inertial hidden Markov model. For example, the transitions related to a temporary stop state and a parked state may be distance dependent. For example, if a vehicle is parked, it is not expected that the vehicle will move. In an example embodiment, a minimum congestion length (MCL) is defined. The MCL is the minimum length of a congested area. For example, if a vehicle 5 is in a temporary stop state (e.g., stopped at a stop light), it is not expected that the vehicle will travel a significant distance before transitioning out of the temporary stop state. For example, in an example embodiment, the MCL is selected as 50-100 meters. For example, if the probe information/data for a vehicle indicates that a vehicle has been traveling at a low speed for a distance of 50-100 meters, the HMM may indicate that the vehicle is not in a temporary stop state, but is in a heavy congestion state. Similarly, a park distance may be defined. In an example embodiment, the park distance is defined as being 20 meters. For example, the transition probability between a temporary stop state at a time corresponding to $t_i$ and a temporary stop state at a time corresponding to $t_{i+1}$, is $$\left({}^{MCL}\sqrt{0.2}\right)^{distance} \text{ or } 0.2^{\frac{distance}{MCL}}$$

(0.2 raised to the power of distance/MCL), wherein the distance "distance" is the distance travelled by the vehicle 5 between the instance of probe information/data captured at time $t_i$ and the instance of porbe information/data captured at time $t_{i+1}$. Similarly, the transition probability that a vehicle 5 that has been in a parked state for a distance "distance" will continue to be in a parked state at time $t_{i+1}$ is $\left({}^{PARK}\sqrt{0.1}\right)^{distance}$ wherein the distance "distance" is the distance travelled by the vehicle 5 between the instance of probe information/data captured at time $t_i$ and the instance of porbe information/data captured at time $t_{i+1}$. Thus, in an example embodiment, one or more of the transition probabilities may be dependent on the distance the vehicle has traveled in that state, the distance travelled between capturing consecutive instances of probe information/data, and/or the like.

FIGS. 6A, 6B, and 6C provide plots of example observational probabilities according to an example embodiment. In an example embodiment, the observational probabilities may be based on a normalized speed. For example, a road segment may be associated with a corresponding free flow speed. A normalized speed for a vehicle traveling along the road segment may be the ratio of the speed of the vehicle (as indicated by the speed information/data of the probe information/data) to the free flow speed for the road segment. Thus, a normalized speed of 1 indicates that the vehicle is traveling at the free flow speed and a normalized speed of 0.4 indicates that the vehicle is traveling at 40% of the free flow speed for the road segment the vehicle is traveling along. The road segment that the vehicle is traveling along may be determined based on the location information/data of the probe information/data. The free flow speed for the road segment may then be determined based on the link information/data corresponding to the road segment in a digital map and/or geographic database. In an example embodiment, if the speed information/data indicates that the normalized speed of the vehicle 5 is 0.72 or greater, the vehicle is likely in a free flow state; if the speed information/data indicates that the normalized speed of the vehicle 5 is between 0.34 and 0.72, the vehicle is likely in a light congestion state; and if the speed information/data indicates that the normalized speed of the vehicle 5 is 0.34 or lower, the vehicle is likely in a heavy congestion, temporary stop, or parked state. Thus, the current probe information/data (e.g., corresponding to time $t_{n+1}$) and the accessed previous traffic state vector(s) and/or previous instance(s) of probe information/data may be used to build a HMM. For example, the current probe information/data may be analyzed using a HMM and the accessed previous traffic state vector(s) and/or previous instance(s) of probe information/data. In an example embodiment, a current traffic state vector may be determined and stored for future use as a previous traffic state vector.

At block 110, the current traffic state is determined. For example, the current traffic state may be determined based on the vehicle traffic state vector corresponding to time $t_{n+1}$ and/or the series or sequence of instances of probe information/data. For example, the remote apparatus 10 (or the probe apparatus 20) may determine the current traffic state for the vehicle 5. For example, the remote apparatus 10 may comprise means, such as the processor 12 and/or the like for determining the current traffic state for the vehicle 5. For example, the current traffic state may be determined based on the analysis of the current probe information/data based on the previous traffic state vector(s) and/or previous instance(s) probe information/data.

For example, current traffic state corresponding to the current probe information/data is obtained by determining and/or solving for the Viterbi-path for the HMM. For example, the Viterbi algorithm may be used to determine and/or solve for the Viterbi-path of the HMM. For example, the Viterbi-path of the HMM may be a path $X=(x_1, x_2, \ldots, x_n, x_{n+1})$, wherein $x_i$ is a sequence of traffic states that generates the observations resulting in the series or sequence of instances of probe information/data. Thus, the Viterbi-path for a HMM built on a series or sequence of probe information/data may be obtained, wherein the Viterbi-path is a likely sequence of traffic states for each instance of probe information/data in the series or sequence of instances of probe information/data. Thus, the current traffic state for the vehicle 5 may be determined based on the series or sequence of probe information/data captured by the probe apparatus 20 onboard the vehicle.

As should be understood, a series or sequence of traffic states for a vehicle may be determined as the instances of probe information/data are received and/or analyzed. For example, FIG. 7 illustrates a series or sequence of traffic states determined for a vehicle 5 based on probe information/data. Each dot corresponds to an instance of probe information/data. The open dots show the location indicated by the location information/data of an instance of probe information/data wherein it was determined that the vehicle was in a free flow state. The filled dots show the location indicated by the location information/data of an instance of probe information/data wherein it was determined that the vehicle was in a temporary stop state. In particular, the temporary stop state was due to a traffic light located at the intersection of the road being traveled by the vehicle and a cross street.

Determining Traffic Information/Data for a Road Segment

A non-limiting example technique of determining traffic information/data for a road segment, in accordance with an example embodiment, will now be described with respect to FIG. 8. FIG. 8 is a flowchart providing some processes and procedures for determining traffic information/data for a road segment, in accordance with an example embodiment. In an example embodiment, the traffic information/data for the road segment is determined in real and/or near real time.

Starting at block 202, probe information/data corresponding to a plurality of vehicles traveling along a road segment are received. For example, a plurality of probe apparatuses 20 may capture probe information/data and provide (e.g., transmit) the probe information/data. For example, a probe apparatus 20 may comprise means, such as the processor 22, memory 24, communications interface 26, sensors 30 and/or the like, for capturing and providing probe information/data. The remote apparatus 10 may receive the probe information/data corresponding to the plurality of vehicles. For example, the remote apparatus 10 may comprise means, such as the processor 12, memory 14, communications interface 16, and/or the like, for receiving the probe information/data corresponding to the plurality of vehicles. For example, the remote apparatus 10 may receive a plurality of series or sequences of instances of probe information/data with each series of sequence of instances of probe information/data corresponding to a vehicle. Based on the location information/data of an instance of probe information/data, the road segment along which the vehicle is traveling may be identified, determined, and/or the like.

At block 204, a current traffic state for each of the vehicles is identified, determined, and/or the like. For example, for each of the series or sequences of instances of probe information/data, a hidden Markov model (HMM) is built based on the series or sequence of instances of probe information/data. A Viterbi-path is determined, solved for, identified, and/or the like for each series or sequence of instances of probe information/data. For example, a technique similar to that described may be used to identify, determine, and/or the like the current traffic state for one or more of the vehicles of the plurality of vehicles for which the probe information/data was received. For example, the remote apparatus 10 may determine, identify, and/or the like a current traffic state for one or more vehicles of plurality of vehicles for which the probe information/data was received. For example, the remote apparatus 10 may comprise means, such as the processor 12 and/or the like, for determining, identifying, and/or the like a current traffic state for one or more vehicles of plurality of vehicles for which the probe information/data was received. Thus, in an example embodiment, the remote apparatus 10 may generate a set of current traffic states corresponding to vehicles traveling along a road segment. In an example embodiment, a probe apparatus 20 may determine a current traffic state for the corresponding vehicle 5 and provide (e.g., transmit) the current traffic state and the remote apparatus 10 may receive the current traffic state At block 206, the set of current traffic states is analyzed. In an example embodiment, the probe information/data corresponding to the plurality of vehicles may be analyzed based on the current traffic states. For example, a current traffic state for the road segment may be determined by analyzing the set of current traffic states corresponding to the plurality of vehicles traveling along the road segment. For example, if the set of current traffic states includes 10 instances of light congestion, 2 instances of free flow, 3 instances of heavy congestion, and 4 instances of temporary stop, it may be determined that the current traffic state of the road segment is light congestion. In another example, the probe information/data may be sorted based on the current traffic state corresponding to vehicle to which the probe information/data pertains. For example, some traffic information/data may be determined based on a subset of the probe information/data corresponding to the plurality of vehicles. For example, the average speed along the road segment may be determined based on probe information/data corresponding to vehicles determined to be in a current traffic state of free flow, light congestion, and/or heavy congestion. For example, probe information/data corresponding to vehicles determined to be parked or at a temporary state may be excluded from a determination of the average speed along the road segment. For example, the remote apparatus 10 may analyze the probe information/data corresponding to the plurality of vehicles. For example, the remote apparatus 10 may comprise means, such as the processor 12 and/or the like, for analyzing the probe information/data.

At block 208, the traffic information/data for the road segment is determined based on the analysis of the probe information/data corresponding to the plurality of vehicles identified as being located on the road segment. For example, the remote apparatus 10 may determine traffic information/data for a road segment based on the analysis of the probe information/data corresponding to the plurality of vehicles identified as being located on the road segment. For example, the remote apparatus 10 may comprise means, such as the processor 12 and/or the like, for determining traffic information/data for a road segment based on the analysis of the probe information/data corresponding to the plurality of vehicles identified as being located on the road segment. For example, traffic information/data may comprise a current traffic state for the road segment, a representative speed (e.g., average speed) for the road segment, speed distribution description (e.g., standard distribution of speeds), a volume of traffic, and/or the like. For example, the representative speed for the road segment may be determined based on the probe information/data corresponding to vehicles determined to be in a current traffic state of free flow, light congestion, and/or heavy congestion. In an example embodiment, the current traffic state for the road segment may be determined based on the mode of the set of current traffic states or based on the representative speed for the road segment.

At block 210, the traffic information/data may be provided to one or more probe apparatuses and/or one or more traffic management systems (e.g., computing entities 35). For example, the remote apparatus 10 may provide (e.g., transmit) traffic information/data. For example, the remote apparatus 10 may comprise means, such as processor 12, communications interface 16, and/or the like, for providing the traffic information/data. For example, one or more probe apparatuses 20 and/or one or more traffic management systems (e.g., computing entities 35) may receive the traffic information/data. For example, a probe apparatus 20 and/or a traffic management system (e.g., computing entity 35) may comprise means, such as processor 22, communications interface 26, and/or the like, for receiving the traffic information/data. In an example embodiment, the traffic information/data may be provided as a layer of a digital map. For example, the traffic information/data may be embedded and/or included in a map tile of a digital map, for example, as a traffic information/data layer. For example, the remote apparatus 10 may generate a map layer comprising the traffic information/data and prepare, package, and/or the like a map tile of a digital map to include the map layer comprising the traffic information/data. The remote apparatus 10 may then provide the map tile.

In an example embodiment, the remote apparatus 10 may determine if the traffic information/data satisfies one or more reporting criteria. For example, if the current traffic state for the road segment is heavy congestion, the traffic information/data may satisfy a heavy congestion reporting criteria, in an example embodiment. In another example, if the representative speed and/or the description of the speed distribution is greater than a predetermined speed and/or less than a predetermined speed, the traffic information/data may satisfy a speed reporting criteria, in an example embodiment. If the traffic information/data satisfies one or more reporting criteria, the remote apparatus 10 may provide the traffic information/data as part of a traffic alert. For example, the remote apparatus 10 may provide (e.g., transmit) a traffic alert comprising the traffic information/data, the portion of the traffic information/data that satisfied the reporting criteria, an indication that the traffic information/data for a road segment satisfied a particular reporting criteria, and/or the like.

At block 212, one or more routing decisions and/or traffic management decisions are made based at least in part on the traffic information/data. For example, a probe apparatus 20 may receive the traffic information/data (e.g., as a traffic information/data layer of a map tile, traffic alert, and/or the like) and use the traffic information/data to inform one or more routing decisions for the vehicle 5. In another example, a traffic management system (e.g., comprising one or more computing entities 35) may receive the traffic information/data (e.g., as a traffic information/data layer of a map tile, traffic alert, and/or the like) and use the traffic information/data to inform one or more traffic management decisions. For example, the traffic management system may determine, based on the traffic information/data, that the timing of a traffic light should be adjusted, modified, and/or the like. In another example, electronic signs in the vicinity of the road segment may be updated to provide a warning/alert regarding the current traffic state, representative speed, and/or the like and/or probe apparatuses 20 aboard vehicles located on or in the vicinity of the road segment may be alerted to the current traffic state, representative speed, and/or the like.

Predicting a Future Traffic State for a Vehicle

In an example embodiment, a future traffic state for a vehicle may be predicted. A non-limiting example technique of predicting a future traffic state for a vehicle, in accordance with an example embodiment, will now be described with respect to FIG. 9. In an example embodiment, a future traffic state for a vehicle may be determined in real and/or near real time and used to inform a routing decision for the vehicle 5.

Starting at block 302, a current traffic state may be determined for the vehicle. For example, the probe apparatus 20 may capture probe information/data. The probe information/data may be analyzed by the probe apparatus 20. In an example embodiment, the probe information/data is provided to a remote apparatus 10 and processed by the remote apparatus 10. For example, the probe information/data may be analyzed to determine a current traffic state for the vehicle 5. For example, as described above, a hidden Markov model (HMM) may be built based on a series or sequence of instances of probe information/data and a current traffic state of the vehicle may be determined based thereon. For example, remote apparatus 10 and/or a probe apparatus 20 may determine a current traffic state of the vehicle. For example, the remote apparatus 10 and/or probe apparatus 20 may comprise means, such as processor 12, 22, communications interface 16, 26, and/or the like, for determining a current traffic state for the vehicle 5.

At block 304, it is determined if a vehicular traffic pattern (VTP) analysis is triggered. For example, it may be determined if the current traffic state for the vehicle 5 satisfies a VTP analysis criteria. For example, if it is determined that the vehicle 5 is experiencing a heavy congestion state, the current traffic state may satisfy a VTP analysis criteria and a VTP analysis may be triggered. In an example embodiment, it may be determined that the vehicle 5 is experiencing a free flow state and it may be determined that the current traffic state does not satisfy a VTP analysis criteria and a VTP analysis may not be triggered. For example, the remote apparatus 10 and/or the probe apparatus 20 may determine if the determined current traffic state of the vehicle 5 satisfies a VTP analysis criteria. For example, the remote apparatus 10 and/or the probe apparatus 20 may comprise means, such as processor 12, 22 and/or the like for determining if the determined current traffic state of the vehicle 5 satisfies a VTP analysis criteria.

If, at block 304, it is determined that the determined current traffic state of the vehicle 5 does not satisfy a VTP analysis criteria, the process returns to block 302. If, at block 304, it is determined that the determined current traffic state of the vehicle 5 does satisfy a VTP analysis criteria, the process continues to block 306. At block 306, relevant historical traffic information/data is accessed. For example, historical traffic information/data may be stored in traffic information/data database, for example, in memory 14. In an example embodiment, the relevant historical traffic information/data may be historical traffic information/data that relates to the road segment the vehicle 5 is traveling along, a road segment adjoining and/or near the road segment the vehicle 5 is traveling along, a road segment along a possible route from the vehicle 5's current location to a destination location, and/or the like. In an example embodiment, the relevant historical traffic information/data is historical traffic information/data that relates to a day of week, time of day, season, particular day of the year, particular event, and/or the like that is the same or similar to the current day, season, time, and/or the like. For example, if the vehicle 5 is traveling to a destination location along a first road segment at 4 pm on a Tuesday, the relevant historical traffic information/data may comprise historical traffic information/data corresponding to the first road segment and the road segments of two possible routes from the vehicle's 5 current location to the destination location that was captured between 3 pm and 5 pm on a Tuesday. In another example, if the vehicle's current location is near Wrigleyville in Chicago on a day that the Cub's have a home game, the relevant historical traffic information/data may comprise historical traffic information/data for one or more road segments in the Wrigleyville area that was captured on a day that the Cub's had a home game. In another example embodiment, the relevant historical traffic information/data may comprise historical traffic information/data for which the traffic state of the road segment the vehicle 5 is traveling along was the same as the current traffic state determined for the vehicle 5. For example, if it was determined at block 302 that the vehicle 5 is currently experiencing a heavy congestion state on a first road segment, the relevant historical traffic information/data may comprise historical traffic information/data corresponding to a heavy congestion state on the first road segment. In an example embodiment, the relevant historical traffic information/data may correspond to a vehicle that traveled along the same road segment as the vehicle 5 at a speed similar to the vehicle's 5 current speed. For example, the remote apparatus 10 may access relevant historical traffic information/data. For example, the remote apparatus 10 may comprise means, such as the processor 12, memory 14, and/or the like, for accessing the relevant historical traffic information/data. In an example embodiment, in which the future traffic state is predicted by the probe apparatus 20, the probe apparatus 20 may request and receive the relevant historical traffic information/data.

At block 308, the accessed relevant historical traffic information/data is analyzed. For example, the remote apparatus 10 (or probe apparatus 20) may analyze the accessed relevant historical traffic information/data. For example, the remote apparatus 10 may comprise means, such as the processor 12 and/or the like, for analyzing the accessed relevant historical traffic information/data. For example, it may be determined how long it is expected that the vehicle 5 will be experiencing the determined current traffic state based on the accessed relevant historical traffic information/data and/or a portion thereof. For example, a VTP analysis may be performed based on relevant historical traffic information/data that has vehicle level granularity. For example, the historical traffic information/data may correspond to a first vehicle that previously experienced a traffic condition (e.g., current traffic state, speed, direction of travel, road segment being traveled, time of day, day of the week, and/or the like) similar to that being currently experienced by the vehicle 5.

At block 310, the predicted future traffic state is generated. For example, the future traffic state may be predicted based on the analysis of the relevant historical traffic information/data. For example, the remote apparatus 10 (or probe apparatus 20) may generate a predicted future traffic state. For example, the remote apparatus 10 may comprise means, such as the processor 12 and/or the like, for generating a predicted future traffic state. For example, it may be predicted that in five minutes, ten minutes, and/or the like the vehicle 5 will be experiencing a particular traffic state. In another example, it may be predicted that in three minutes, seven minutes, and/or the like, the current traffic state of the vehicle 5 will change.

At block 312, the predicted future traffic state is provided. For example, the remote apparatus 10 may provide (e.g., transmit) a communication comprising the predicted future traffic state. For example, the remote apparatus 10 may comprise means, such as the processor 12, communications interface 16, and/or the like, for providing a communication comprising the predicted future traffic state. The probe apparatus 20 may receive the communication comprising the predicted future traffic state. For example the probe apparatus 20 may comprise means, such as the processor 22, communications interface 26, and/or the like for receiving the communication comprising the predicted future traffic state. The probe apparatus 20 may then process the communication comprising the predicted future traffic state and, in an example embodiment, in response to processing the communication, the probe apparatus 20 may provide (e.g., display, audibly provide, and/or the like) the predicted future traffic state to a user. For example, the probe apparatus 20 may comprise means, such as processor 22, user interface 28, and/or the like, for processing the communication and, in response to processing the communication, providing (e.g., displaying, audibly providing, and/or the like) the predicted future traffic state to a user. In an example embodiment, the predicted future traffic state is provided to the user in real time and/or near real time with respect to the capturing of the probe information/data that lead to the determination of the current traffic state that triggered the VTP analysis.

In an example embodiment, in response to the predicted future traffic state, the user may provide input (e.g., via the user interface 26 of the probe apparatus 20) indicating a rerouting request. For example, a user may select one or more hard or soft buttons of the user interface 26 or provide a voice command requesting a rerouting of the vehicle 5 based on the predicted future traffic state. In an example embodiment, the probe apparatus 20 may automatically determine that a rerouting should occur based on the predicted future traffic state. For example, if the predicted future traffic state indicates that it is expected that the vehicle 5 will be in a heavy congestion state for 20 minutes or that the vehicle 5 will only be in a free flow state for another 5 minutes, the probe apparatus 20 may automatically determine a rerouting of the vehicle 5. For example, in an example embodiment, if the predicted future traffic state satisfies a threshold requirement, the probe apparatus 20 may automatically determine a rerouting for the vehicle 5. For example, the probe apparatus 20 may automatically generate a rerouting request. At block 314, it is determined if a rerouting request has been received. For example, the probe apparatus 20 may determine if a rerouting request was received. For example, the probe apparatus 20 may comprise means, such as the processor 22, user interface 26, and/or the like, for determining if a rerouting request was received.

If, at block 314, it was determined that a rerouting request was not received, the process returns to block 302. If, at block 314, it was determined that a rerouting request was received, the process continues to block 316. At block 316, a new route is determined based on the current traffic information/data, the analysis of the relevant historical traffic information/data, and/or the like. For example, the remote apparatus 10 and/or the probe apparatus 20 may determine a new route for the vehicle 5 based on the current traffic information/data, the analysis of the relevant historical traffic information/data, and/or the like. For example, the remote apparatus 10 and the probe apparatus 20 may comprise means, such as processor 12, 22 and/or the like, for determining a new route for the vehicle 5 based on the current traffic information/data, the analysis of the relevant historical traffic information/data, and/or the like. The new route may then be provided to the user, the vehicle 5 may be automatically and/or autonomously routed along the new route, and/or the like.

III. Example Apparatus

The probe apparatus 20, computing entity 35, and/or remote apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the probe apparatus 20, computing entity 35, and/or remote apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In an example embodiment, a probe apparatus 20 is an in-vehicle navigation system onboard a vehicle 5, a remote apparatus 10 is a server configured to provide Cloud-based computing resources to one or more probe apparatuses 20, and a computing entity 35 is a traffic management system. In this regard, FIG. 2A depicts a remote apparatus 10 and FIG. 2B depicts a probe apparatus 20 of an example embodiment that may be embodied by various computing devices including those identified above. As shown, the remote apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22, and a memory device 24, and optionally a communication interface 26, a user interface 28, one or more sensors 30 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In example embodiments, a computing entity 35 may, similar to the remote apparatus 10 and/or probe apparatus 20, comprise a processor, memory device, communication interface, user interface, and/or one or more additional components configured to perform various operations, procedures, functions, or the like described herein. In an example embodiment, a computing entity 35 may comprise one or more sensors similar to the one or more sensors 30.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the remote apparatus 10, computing entity 35, and/or probe apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10, computing entity 35, and/or probe apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24, and/or the like).

The remote apparatus 10, computing entity 35, and/or the probe apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10, computing entity 35, and/or probe apparatus 20 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map and/or link, and/or the like. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the probe apparatus 20 and/or computing entity 35 may be configured to execute computer-executable instructions provided by and/or referred to by a data record. In an example embodiment, the remote apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more probe apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a remote apparatus 10, computing entity 35, and/or probe apparatus 20 in accordance with an example embodiment may determine the time to traverse a route that includes one or more turns at respective intersections more accurately.

IV. Apparatus, Methods, and Computer Program Products

As described above, FIGS. 3, 8, and 9 illustrate flowcharts of apparatuses 10, 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor, at least one communications interface, and at least one memory storing computer program code, with the at least one memory and the computer program code configured to, with the processor, cause the apparatus to at least:

receive, via the at least one communications interface, an instance of probe data captured by one or more sensors of a probe apparatus onboard a particular vehicle, the instance of probe data comprising speed data indicating the speed of the particular vehicle when the instance of probe data was captured;

access from the at least one memory one or more previous instances of probe data captured by the probe apparatus onboard the particular vehicle;

analyze the instance of probe data based on the one or more previous instances of probe data; and determine a current traffic state for the particular vehicle based on the analysis of the instance of probe data based on the one or more previous instances of probe data, the current traffic state being a state of a predefined set of states.

2. An apparatus according to claim 1, wherein to analyze the instance of probe data based on the one or more previous instances of probe data the at least one memory and the computer program code are configured to, with the processor, cause the apparatus to at least:
generate a hidden Markov model based on the speed data of the instance of probe data and the previous instances of probe data;
obtain a Viterbi-path corresponding to the instance of probe data and the previous instances of probe data; and
define the current traffic state based on the Viterbi-path.

3. An apparatus according to claim 2, wherein the hidden Markov model is generated based at least in part on one or more transition probabilities and at least one of the one or more transition probabilities is distance dependent.

4. An apparatus according to claim 2, wherein the hidden Markov model is generated based at least in part on one or more observation probabilities and the one or more observation probabilities are dependent on normalized speed determined based at least in part on the speed data.

5. An apparatus according to claim 2, wherein the hidden Markov model is built based on the predefined set of traffic states, the predefined set of traffic states comprising a free flow state, a light congestion state, a heavy congestion state, a temporary stop state, and a parked state.

6. An apparatus according to claim 5, wherein the at least one memory and the computer program code are further configured to, with the processor, cause the apparatus to at least:
determine that the particular vehicle is not in the temporary stop state or in the parked state; and
determine a representative speed for a road segment identified based on the instance of probe data based at least in part on the speed data.

7. An apparatus according to claim 1, wherein the at least one memory and the computer program code are further configured to, with the processor, cause the apparatus to at least:
determine a traffic state for a road segment corresponding to location data based at least in part on the current traffic state, wherein the instance of probe data comprises the location data; and
provide the traffic state for the road segment to at least one of a probe apparatus, a traffic management system, or both via the at least one communications interface.

8. An apparatus according to claim 1, wherein the at least one memory and the computer program code are further configured to, with the processor, cause the apparatus to at least:
analyze relevant historical probe data corresponding to the instance of probe data;
generate a predicted future traffic state for the particular vehicle based on the analysis of the relevant historical probe data; and
provide a communication comprising the predicted future traffic state to the probe apparatus via the at least one communications interface, wherein the probe apparatus process the communication and, responsive thereto, provides the predicted future traffic state via a user interface of the probe apparatus.

9. An apparatus according to claim 8, wherein the at least one memory and the computer program code are further configured to, with the processor, cause the apparatus to at least:
receive a rerouting request via the at least one communications interface; and
determine a new route for the particular vehicle based on the analysis of the relevant historical probe data.

10. A method comprising:
receiving an instance of probe data captured by one or more sensors of a probe apparatus onboard a particular vehicle, the instance of probe data comprising speed data indicating the speed of the particular vehicle when the instance of probe data was captured;
accessing one or more previous instances of probe data captured by the probe apparatus onboard the particular vehicle;
analyzing the instance of probe data based on the one or more previous instances of probe data; and
determining a current traffic state for the particular vehicle based on the analysis of the instance of probe data based on the one or more previous instances of probe data, the current traffic state being a state of a predefined set of states.

11. A method according to claim 10, wherein analyzing the instance of probe data based on the one or more previous instances of probe data comprises:
generating a hidden Markov model based on the speed data of the instance of probe data and the previous instances of probe data;
obtaining a Viterbi-path corresponding to the instance of probe data and the previous instances of probe data; and
defining the current traffic state based on the Viterbi-path.

12. A method according to claim 11, wherein the hidden Markov model is generated based at least in part on one or more transition probabilities and at least one of the one or more transition probabilities is distance dependent.

13. A method according to claim 11, wherein the hidden Markov model is generated based at least in part on one or more observation probabilities and the one or more observation probabilities are dependent on normalized speed determined based at least in part on the speed data.

14. A method according to claim 11, wherein the hidden Markov model is built based on the predefined set of traffic states, the predefined set of traffic states comprising a free flow state, a light congestion state, a heavy congestion state, a temporary stop state, and a parked state.

15. A method according to claim 14, further comprising:
determining that the particular vehicle is not in the temporary stop state or in the parked state; and
determining a representative speed for a road segment identified based on the instance of probe data based at least in part on the speed data.

16. A method according to claim 10, further comprising:
determining a traffic state for a road segment corresponding to location data based at least in part on the current traffic state, wherein the instance of probe data comprises the location data; and
providing the traffic state for the road segment to at least one of a probe apparatus, a traffic management system, or both.

17. A method according to claim 10, further comprising:
analyzing relevant historical probe data corresponding to the instance of probe data;
generating a predicted future traffic state for the particular vehicle based on the analysis of the relevant historical probe data; and
providing a communication comprising the predicted future traffic state to the probe apparatus, wherein the probe apparatus process the communication and, responsive thereto, provides the predicted future traffic state via a user interface of the probe apparatus.

18. A method according to claim 17, further comprising:
receiving a rerouting request; and
determining a new route for the particular vehicle based on the analysis of the relevant historical probe data.

19. A computer program product comprising at least one non-transitory computer-readable storage medium having computer-executable program code instructions stored therein with the computer-executable program code instructions comprising program code instructions configured to:
receive an instance of probe data captured by one or more sensors of a probe apparatus onboard a particular vehicle, the instance of probe data comprising speed data indicating the speed of the particular vehicle when the instance of probe data was captured;
access one or more previous instances of probe data captured by the probe apparatus onboard the particular vehicle;
analyze the instance of probe data based on the one or more previous instances of probe data; and
determine a current traffic state for the particular vehicle based on the analysis of the instance of probe data based on the one or more previous instances of probe data, the current traffic state being a state of a predefined set of states.

20. A computer program product according to claim 19, wherein to analyze the instance of probe data based on the one or more previous instances of probe data the program the computer-executable program code instructions comprise program code instructions configured to:
generate a hidden Markov model based on the speed data of the instance of probe data and the previous instances of probe data;
obtain a Viterbi-path corresponding to the instance of probe data and the previous instances of probe data; and
define the current traffic state based on the Viterbi-path.

* * * * *